July 23, 1935.  H. C. FRENCH ET AL  2,008,858
TANK VEHICLE
Filed Feb. 9, 1934  2 Sheets-Sheet 1
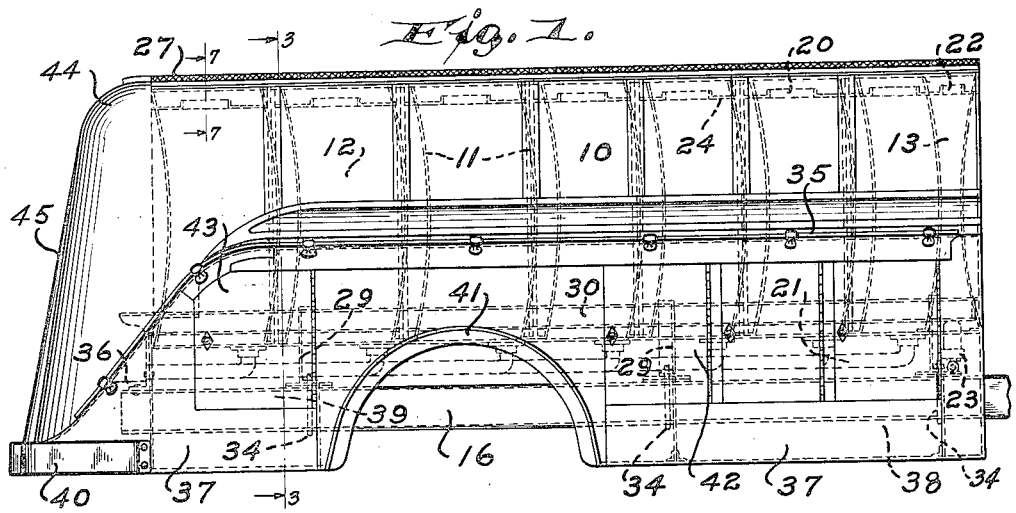
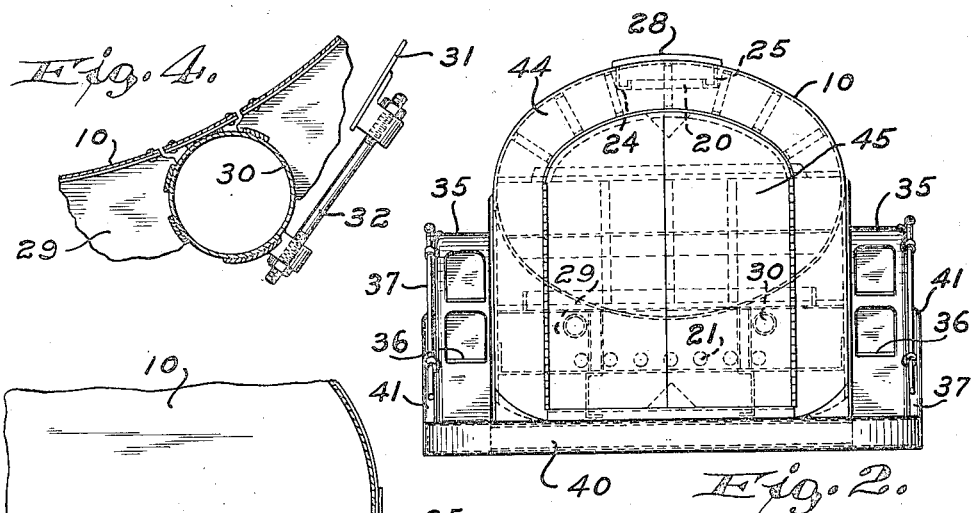
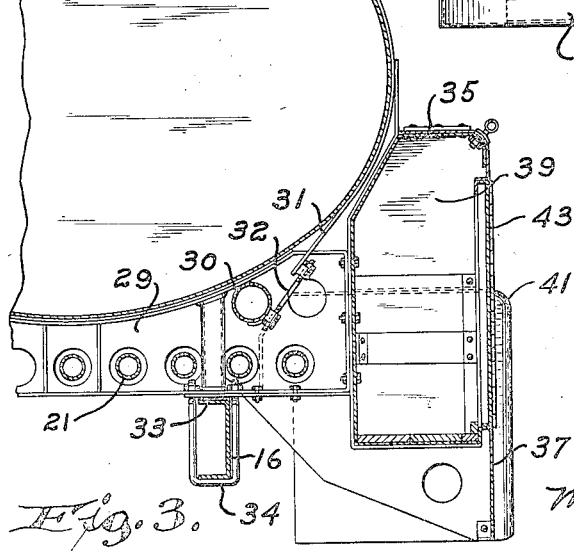
INVENTORS
H. C. French
BY F. G. Thwaits
Morsell, Lieber & Morsell
ATTORNEY.

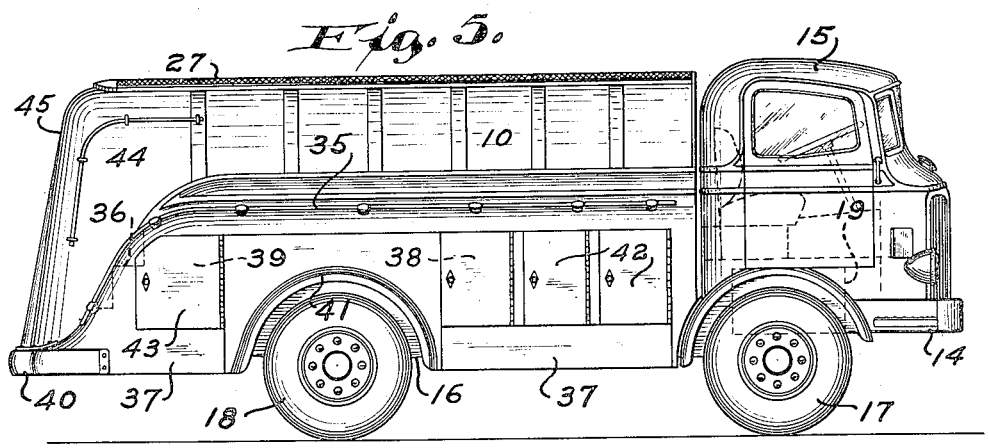
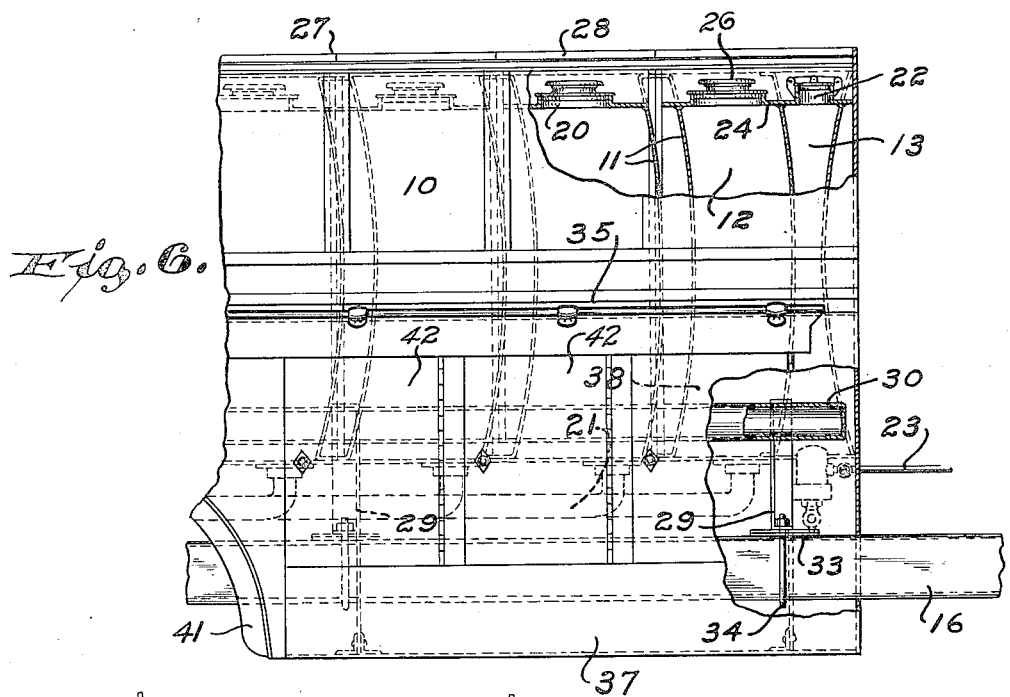
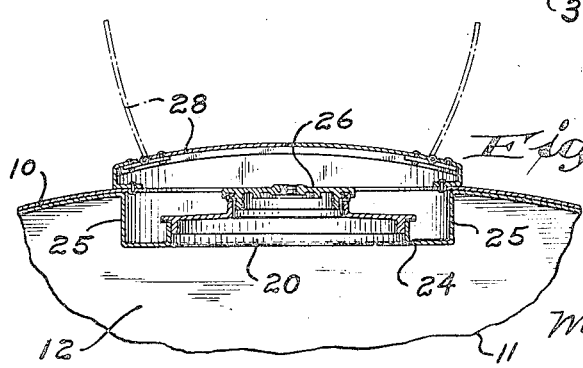

Patented July 23, 1935

2,008,858

UNITED STATES PATENT OFFICE 2,008,858

TANK VEHICLE

Henry C. French, Milwaukee, and Frederick G. Thwaits, Wauwatosa, Wis., assignors to The Heil Co., Milwaukee, Wis., a corporation of Wisconsin Application February 9, 1934, Serial No. 710,456

8 Claims. (Cl. 280—5)

The present invention relates in general to improvements in the construction of fluid storage and dispensing receptacles, and to improved means for mounting such receptacles upon conveying vehicles, and relates more specifically to various improvements in so-called tank trucks for transporting liquids such as water, gasoline, oil, milk, or the like.

An object of the invention is to provide an improved tank vehicle which is simple and durable in construction, and which is, moreover, highly attractive in appearance.

Another object of the invention is to provide an improved tank truck which is compact but spacious, and all portions of which are made readily accessible and available for storage purposes.

A further object of the invention is to provide a combined tank and vehicle assemblage wherein the load and accessory equipment are effectively concealed and protected, and which will offer minimum resistance to travel.

Still another object of the invention is to provide improved means for mounting a fluid container upon the chassis of a vehicle and instrumentalities whereby a portion of the main container is made available for the storage of fuel for the propelling motor of the vehicle.

An additional object of the invention is to provide improved auxiliary housings associated with the main container of a tank vehicle for permitting storage, concealment, and safe transportation of accessory equipment.

Other objects of the invention are to provide various improvements in tank vehicle structures, whereby all space is made available for use to the fullest possible extent, which will fulfill the present day requirement for stream-line appearance, and which can be manufactured and sold at moderate cost.

These and other objects and advantages will be apparent from the following detailed description, and some of the novel features of tank construction disclosed but not specifically claimed herein form the subject of copending application Serial No. 699,662, filed November 25, 1933.

A clear conception of the several features constituting the present invention, and of the mode of constructing and of utilizing tank vehicles built in accordance therewith, may be had by referring to the drawings accompanying and forming a part of this specification in which like reference characters designate the same or similar parts in the various views.

Fig. 1 is a side elevation of the improved tank structure separated from the vehicle;

Fig. 2 is an end view of the improved tank structure showing the same removed from the vehicle;

Fig. 3 is an enlarged, fragmentary transverse sectional view thru the improved tank structure, the section being taken near the forward end of the tank;

Fig. 4 is a further enlarged fragmentary end view of the lower portion of the tank and of the supporting structure therefor;

Fig. 5 is a side view of the completed improved tank truck;

Fig. 6 is an enlarged fragmentary part-sectional view of the forward end of the tank structure; and Fig. 7 is a transverse section thru the upper portion of one of the tank compartments.

While the various features of the improvement have been shown and described herein as being specifically applied to a motor driven tank truck for transporting liquid such as petroleum products, it is not intended to limit the invention by such specific disclosure since some of these features may obviously be more generally applicable.

Referring to the drawings, and especially to Figs. 1 and 5 thereof, the improved tank vehicle comprises in general an elongated tank 10 having an elliptical transverse cross-section and being divided by partitions 11 into a series of segregated compartments 12, 13; and a truck 14 having a driver's cab 15 and a chassis 16 upon which the tank 10 is supported rearwardly of the cab. The truck 14 is of relatively conventional construction, the chassis 16 being mounted upon front and rear wheels 17, 18, either or both sets of which are adapted to be driven by a motor 19 disposed within the cab 15 beneath the driver's seat.

The tank 10 may be constructed either as a unitary outer shell having the partitions 11 secured therein, or as a series of individual sections connected to each other as by welding to provide a unitary structure, and each of the main compartments 12 has an upper inlet or inspection opening 20 and a lower outlet or dispensing conduit 21, the latter extending either to the sides or to the rear of the truck and being provided with suitable control valves. The auxiliary fuel compartment 13 is preferably located at the extreme end of the tank 10 nearest the motor 19, and has an upper filling opening 22 and a lower fuel discharge conduit 23 which is connected to the fuel supply mechanism of the motor 19. The upper openings 20, 22, are formed in a trough-shaped plate 24 shown in detail in Fig. 4, and the plate 24 may extend throughout the length of the tank 10 and has side walls 25, the upper extremities of which are preferably secured as by welding, to the uppermost portion of the tank shell. The openings 20, 22 are also provided with suitable covers 26 normally concealed within the trough, and a walk 27 extends along the top of the tank 10 above the trough plate 24, being provided with removable doors 28 for permitting access to the covers 26. With this arrangement of elements, the inspection openings and the covers therefor are normally totally concealed, but are quickly accessible at all times.

As clearly shown in Figs. 2, 3, 4, and 6, the bottom of the tank 10 rests directly upon bolsters 29 forming saddles extending transversely beneath the tank, and these bolsters are of less length than the overall width of the tank. As shown, there are several of these bolsters 29, and tubular beams 30 are interposed between the bolsters and the tank body, thus providing both longitudinal and lateral supports for the tank bottom. The tank 10 is firmly attached to the casing beams 30 by means of straps 31 and adjustable connectors 32, as shown in Fig. 4, and the beams 30 are rigidly attached to the several bolsters 29 by welding or otherwise, thus insuring firm attachment of the tank structure within its supporting saddles. The bolsters 29 extend across and rest upon pads 33 carried by the chassis 16, and are firmly connected to the chassis side beams by U-bolts 34 which embrace the chassis beams and are attached to the bolster flanges by nuts, as shown in Fig. 3. The tank structure is thus adapted to be firmly but detachably connected to the vehicle chassis 16 with the aid of the beams 30 and bolsters 29, and the latter may be provided with alined openings for accommodating the dispensing conduits 21 which are preferably located above the top of the chassis in order to avoid interfering with the vehicle propelling mechanism.

Disposed on each side of the tank 10 and secured thereto at about the central horizontal plane thereof, is a walk or running board 35, and these running boards extend from the forward end of the tank 10 adjacent to the cab 15, and connect with rear stairways 36 leading to the rear lowermost part of the tank assemblage. The rear drive wheels 18 are disposed intermediate the forward and rear ends of the tank 10 in order to secure proper distribution of the load, and the running boards 35 are disposed above and extend outwardly over these wheels 18. The outer edges of the running boards may be provided with railings as shown, and have depending skirtings or walls 37 forming the outer walls of auxiliary storage housings 38, 39, disposed on opposite sides of the rear wheels 18, as shown in Figs. 1, 3, and 5. The lower ends of the walls 37 terminate approximately at the horizontal central plane of the vehicle wheels 17, 18, as indicated in Fig. 5, and in alinement with the bottom of a rear platform 40 at which the stairways 36 also terminate; and the walls 37 may be cut away and provided with fenders 41 adjacent to the rear wheels 18, as shown.

The auxiliary compartments or housings 38, 39, which are disposed beneath the running boards 35, may be utilized for the storage of auxiliary equipment of any kind, and these housings are preferably secured to and carried directly by the adjacent ends of the tank supporting bolsters 29, as illustrated in Fig. 3. The front housings 38, which are of greater length than the rear housings 39, are readily accessible thru swinging doors 42, the rear housings having similar doors 43, all of which are carried by hinges at the forward ends thereof and are provided with suitable latches. By supporting these housings 38, 39, from the ends of the bolsters 29 as shown, the housings may be extended inwardly beneath the sides of the tank 10, thus providing maximum storage space, and in some cases it may be desirable to place the dispensing faucets for some of the tank compartments 12 directly within the housings 38, 39. Since the housings 38, 39 extend from the running boards 35 to the lower ends of the skirting walls 37, and are entirely free from internal supporting structure, it will be apparent that they provide considerable storage area, without marring the external attractive appearance of the tank assemblage.

The rear end of the tank structure above the rear platform 40 is also provided with a housing 44 which merges into the rear end of the tank 10, and the rear wall of which is downwardly and rearwardly inclined so as to enhance the stream-line appearance produced by the stairways 36. The rear portion of the housing 44 is provided with doors 45 for permitting access to the dispensing faucets and other equipment normally confined within the rear housing, and the ends of the tubular beams 30 open into this housing 44 and may thus be utilized for the insertion and storage of hose. Suitable hand rails may also be provided at the stairways 36 which extend along the sides of the rear housing 44, and the external portions of the tank structure may be decorated and finished to produce a highly attractive appearance.

The tank structure may obviously be readily assembled by applying the tank 10 to the supporting bolsters 29 and beams 30, and by subsequently attaching the various housings 38, 39, 44, to the tank and to the bolsters in the manner previously described, and the completed tank assemblage may thereafter be secured to a standard truck chassis 16 by merely applying the U-bolts 34. When the vehicle has been completely assembled as shown in Fig. 5, the tank structure cooperates with the cab 15 to present an extremely neat and pleasing appearance, with a stream-line effect, and all of the unsightly parts such as the upper manhole covers and lower dispensing conduits are concealed from view.

The provision of a fuel compartment 13, directly within the main tank 10, eliminates the necessity of providing a special fuel tank; and the location and extent of the auxiliary housings 38, 39, 44, provide ample room for the storage of auxiliary equipment. The beams 30 are available and readily accessible for the storage of hose, which may be removed from and inserted within the beams 30 thru the rear doors 45 of the housing 44. The running boards 35 and upper walk 27 permit convenient access to the upper openings 20, 22 and to the covers 26 for these openings, and the doors 28 enable the attendant to gain access to any desired portion of the trough formed by the plate 24. By providing this plate 24 with side walls 25 secured to the uppermost portion of the tank 10, attachment of the plate 24 to the tank is facilitated and visible welded joints are avoided. The upper rounded portion of the rear housing 44 may be constructed in any suitable manner, and the rearward sloping of this housing cooperates with the stairways 36 to enhance the beauty of the structure. It has been found, in actual use, that the present improved tank assemblage is spacious and readily accessible in every respect, and can be manufactured at relatively low cost to produce an extremely durable and neat-appearing tank vehicle.

It should be understood that it is not desired to limit the invention to the exact details of construction and to the precise mode of utilizing tank trucks built in accordance therewith, for various modifications within the scope of the claims may occur to persons skilled in the art.

It is claimed and desired to secure by Letters Patent:

1. In combination, a tank, bolsters extending transversely beneath said tank, tubular casings secured to said bolsters and coacting with the bottom of said tank, means for attaching said tank directly to said casings, and means for attaching said bolsters to the chassis of a vehicle.

2. In combination, an elongated elliptical sectioned tank, bolsters forming saddles extending transversely beneath said tank, the weight of said tank being substantially balanced upon said wheels, tubular beams interconnecting said bolsters and coacting directly with the bottom of said tank, said beams forming casings accessible from the rear of the tank directly, means for attaching said tank to said beams, and means for detachably connecting said bolsters to the chassis of a vehicle.

3. In combination, an elongated tank having a series of liquid-confining compartments, means forming running boards on opposite sides of said tank near the horizontal central plane thereof, means forming a platform rearwardly of and beneath the bottom of said tank, a housing contiguous with the end of said tank disposed above said platform, the rear wall of said housing sloping downwardly and rearwardly and being provided with doors for permitting access to the interior of the housing, and stairways disposed on opposite sides of said housing and extending from said platform to said running boards.

4. In combination, an elongated tank, a vehicle having a chassis for supporting said tank, the rear wheels of the vehicle being disposed intermediate the ends of said tank to substantially balance the weight thereof, means providing running boards on the opposite sides of said tank near the central horizontal plane thereof, skirtings depending from the outer edges of said running boards and terminating substantially in the horizontal central planes of the wheels, and stairways disposed on opposite sides of the tank and extending from the rear lower portion of said skirtings to said running boards.

5. In combination, an elongated tank, bolsters forming saddles for supporting said tank, beams coacting directly with said tank and with said bolsters, a vehicle chassis cooperable with said bolsters, and U-bolts embracing the side beams of said chassis and secured to said bolsters.

6. In combination, a tank, bolsters extending transversely beneath said tank, tubular casings rigidly attached to said bolsters and coacting directly with the bottom of the tank throughout substantially the entire length thereof, means for detachably connecting said tank directly to said casings, and means for detachably attaching said bolsters to the chassis of a vehicle.

7. In combination, a sectional tank structure having compartments segregated by partitions, bolsters extending transversely beneath said tank structure, tubular beams secured to said bolsters and coacting directly with the bottom of said tank structure, straps coacting with said tank structure at said partitions and having their lower ends secured directly to said tubular beams, and means for attaching said bolsters to the chassis of a vehicle.

8. In combination, a tank, a vehicle for transporting said tank having wheels disposed substantially midway between the ends of said tank, bolsters extending transversely beneath said tank, tubular beams rigidly attached to said bolsters and coacting directly with the bottom of said tank said beams being supported upon said vehicle, means for attaching said tank directly to said beams, and means for attaching said bolsters to the chassis of the vehicle.

HENRY C. FRENCH.
FREDERICK G. THWAITS.